(No Model.)
B. G. LAMME.
SYSTEM OF ELECTRICAL DISTRIBUTION.
No. 520,965. Patented June 5, 1894.
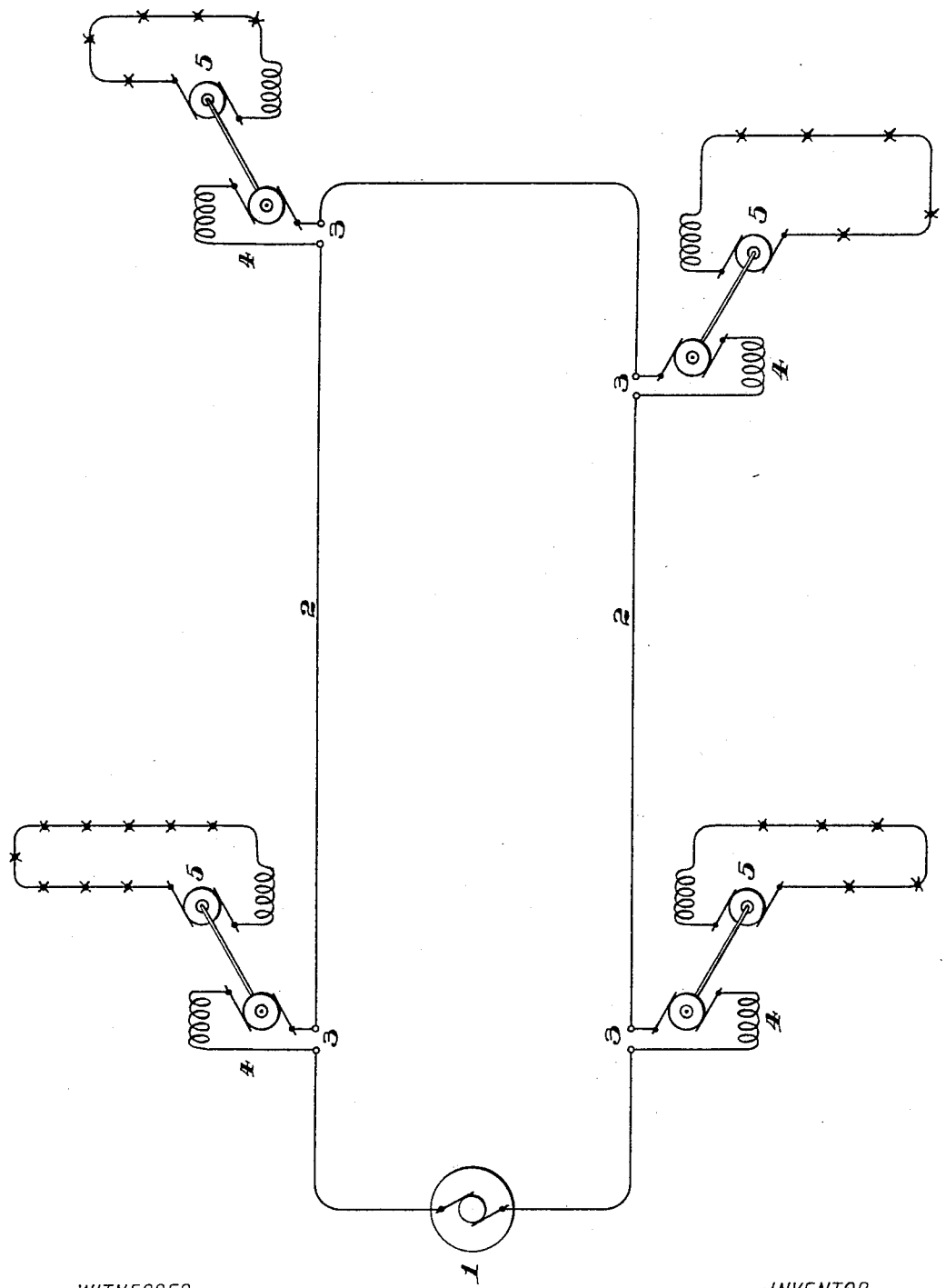
WITNESSES:
George Brown Jr
INVENTOR
Benjamin G. Lamme
BY
Terry and MacKaye
ATTORNEYS

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

SYSTEM OF ELECTRICAL DISTRIBUTION.

SPECIFICATION forming part of Letters Patent No. 520,965, dated June 5, 1894.

Application filed March 27, 1893. Serial No. 467,749. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Systems of Electrical Distribution, (Case No. 538,) of which the following is a specification.

My invention relates to methods and means whereby the advantages of alternating current transmission can be combined with those of direct current distribution, and whereby, from a constant current generator, at a central station, currents of reduced potential and constant quantity may be obtained on the line. Reduction of potential, while usually found convenient is not, however an essential feature of my invention. In practicing my invention it is also possible to obtain different potentials simultaneously at different points, and keep the current constant at such points.

My invention is illustrated in the accompanying drawing, which is a diagram of circuits disposed in accordance with my invention.

At 1 is shown an alternating current generator supplying constant current, and preferably of the well known Stanley type, whereby in the armature polarity overpowers that of the field magnets. The main line 2, from this generator passes at the terminals, 3, through any number of alternate current motors, wound as ordinary direct current motors, having the field magnet in series with the armature, as shown at 4. By making the generator 1 a slow alternation machine, the self-induction of the field magnets is reduced to a minimum.

At 5 are shown direct current series generators which are run by the motors 4. The armatures of 4 and 5 may be mounted upon the same shaft, or other driving means may be employed. The current from these direct current generators is utilized to run translating devices in series, as indicated. These may, of course, be arc lights.

The generator 1 being a constant current machine, and the motors 4 being series wound, these motors will have a constant torque, since torque depends upon the product of field magnet and armature currents, and these are equal and constant.

Considering now one of the generators 5, it will be seen that, on cutting out a light in its circuit, the current will be momentarily increased, this will strengthen both field and armature, and thus increase the resistance to motion of the generator. The torque supplied by the motor 4 being constant, this extra resistance causes a slowing up of the motor, thus reducing the electromotive force of the generator driven thereby. This slowing up will continue until the original resistance to motion is regained, and the constant torque of the motor 4 again balanced. But this only occurs when the field magnet and armature are excited by the original current. Hence it is seen that the series generators 5, supplying translating devices in series will give a constant current with an electromotive force varying with the speed; when driven by a constant torque motor 4. It will thus be possible to supply direct current circuits with constant currents of any desired quantity and requisite electromotive force, from a single central alternator of constant current, different from or equal to the currents supplied to said direct current circuits.

What I claim is—

1. A constant current alternating generator, a series motor in the circuit thereof, a constant current series direct current generator driven by said motor, and translating devices in series with said direct current generator, substantially as described.

2. The method of producing constant direct currents in separated localities, which consists in supplying an alternating current of constant quantity producing therefrom rotary motion of constant torque, and converting the energy of such motion into electrical energy of one polarity, substantially as described.

In testimony whereof I have hereunto subscribed my name this 24th day of March, A. D. 1893.

BENJ. G. LAMME.

Witnesses:
JAMES WM. SMITH,
HAROLD S. MACKAYE.